United States Patent
John

(10) Patent No.: US 6,216,106 B1
(45) Date of Patent: Apr. 10, 2001

(54) METHOD AND ARRANGEMENT IN A COMMUNICATION NETWORK

(75) Inventor: Mee John, Dublin (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/210,739

(22) Filed: Dec. 15, 1998

(30) Foreign Application Priority Data

Dec. 16, 1997 (SE) .................................................. 9704697

(51) Int. Cl.[7] ........................ G10L 13/00; H04M 3/533; H04M 11/02
(52) U.S. Cl. ...................... 704/270; 704/258; 379/93.24; 379/100.08; 455/413; 455/412
(58) Field of Search .................................. 704/379, 270, 704/268, 258; 379/88.13, 88.12, 67.1, 70, 88.25, 88.26, 93.24, 100.08; 455/413, 414, 412

(56) References Cited

U.S. PATENT DOCUMENTS

| | | | |
|---|---|---|---|
| 4,972,461 | * 11/1990 | Brown et al. | 379/88.26 |
| 5,353,259 | 10/1994 | Howes et al. | 369/25 |
| 5,434,909 | 7/1995 | Price et al. | 379/88 |
| 5,481,597 | * 1/1996 | Given | 379/88.26 |
| 5,711,011 | * 1/1998 | Urs et al. | 379/88.25 |
| 5,717,741 | * 2/1998 | Yue et al. | 379/88.12 |

FOREIGN PATENT DOCUMENTS

| | | |
|---|---|---|
| 0 371 906 | 6/1990 | (EP). |
| 96/38987 | 12/1996 | (WO). |
| 96/42163 | 12/1996 | (WO). |

* cited by examiner

Primary Examiner—Richemond Dorvil
Assistant Examiner—Daniel A. Nolan
(74) Attorney, Agent, or Firm—Burns, Doane, Swecker & Mathis, L.L.P.

(57) ABSTRACT

The invention relates to a service in a communication network (100) comprising a voice messaging system (VMS1) containing a mailbox assigned to a voice mail subscriber (MS1). According to the invention, the communication network (100) transfers a voice message (105) from the calling party (TE1) to the voice messaging system (VMS1) where the message is stored in the mailbox. At some later point in time, the communication network transfers a request (106) for the status of the voice message from the calling party (TE1) to the voice messaging system (VMS1). The voice messaging system returns information (107) reflecting the status of the voice message to the calling party (TE1). In response to activities performed by the voice mail subscriber (MS1) on the voice message (105), the message status may be changed in between storage of the voice message and receipt of the status request in the voice messaging system (VMS1).

18 Claims, 3 Drawing Sheets

METHOD AND ARRANGEMENT IN A COMMUNICATION NETWORK

This application claims priority under 35 U.S.C. §§119 and/or 365 to 9704697-3 filed in Sweden on Dec. 16, 1997; the entire content of which is hereby incorporated by reference.

TECHNICAL FIELD OF THE INVENTION

The invention relates to a method and an arrangement in a communication network for providing a voice mail related service. More precisely the service is related to providing information of message status of voice messages stored in a voice messaging system.

DESCRIPTION OF RELATED ART

Voice mail is a feature of modern telephone systems, both Public Switched Telephone Networks (PSTN) and Public Land Mobile Networks (PLMN), that allows a calling party to leave a voice message for subsequent retrieval by a called party. The voice message is stored in a mailbox assigned to the called party in a voice messaging system (VMS). The called party can later on retrieve and listen to the stored voice message. The voice mail feature is most often used in the event of unsuccessful call completion, e.g. due to the called party, being a mobile subscriber in a cellular network, having turned off his mobile phone.

A problem with the voice mail feature, alternatively referred to as a call answering feature, is that, unless the called party contacts the calling party, the calling party has no way of finding out whether the called party has listened to the voice message or not.

The European patent application EP 0 371 609 discloses a method in an electronic mail system for providing confirmation to a sender of electronic mail of selected activities by a recipient thereof. The method comprises the steps of designating a selected electronic mail for which confirmation of selected activities by a recipient thereof is desired, monitoring the activities of the recipient of the electronic mail and transmitting a confirmation message to the sender in response to the performance of the selected activities by the recipient. Thus, before the electronic mail is sent from a first computer system to which the sender is connected, the sender designates the electronic mail as a message for which confirmation of certain selected activities by the recipient are requested. Upon receipt of the electronic mail in a second computer system to which the recipient is connected, the second computer system starts monitoring the activities of the recipient and when one of the selected activities is performed on the electronic mail, the confirmation message is sent to the first computer system. The method described in EP 0 371 609 is only applicable in electronic mail systems, i.e. systems whereby messages may be sent between and/or received between two computers or work stations.

SUMMARY OF THE INVENTION

The problem dealt with by the present invention is to provide a service enabling a calling party, who has left a voice message in a mailbox assigned to a voice mail subscriber, to receive information on message status of the voice message.

The problem is solved essentially by a method in which the calling party, subsequent to leaving the voice message, makes a request for the status of the voice message and in response to said request is informed of the message status. The problem solution includes a voice messaging system and a communication network with the necessary means for performing the method.

More specifically, the problem is solved in the following manner. The communication network transfers the voice message from the calling party to the voice messaging system. The voice messaging system stores the voice message in the mailbox assigned to the voice mail subscriber and initiates a data structure, holding information on the status of the voice message, to indicate the message as being unplayed. At some later point in time, the communication network transfers a request for the message status of the voice message from the calling party. The voice messsaging systems returns to the calling party information reflecting the status of the voice message.

After the storing of the voice message, but before the request for the status message is received by the voice messaging system, activities may be performed on the voice message, such as playing or deleting the message, which results in the message status being updated.

The intention of the invention is thus to enable the calling party, after leaving a voice message in the mailbox assigned to the voice mail subscriber, to obtain, after interrogation to the voice messaging system, information on the status of the voice message.

An advantage afforded by the invention is that the calling party can find out whether the voice mail subscriber has listened to the voice message or not.

The invention will now be described in more detail with reference to exemplifying embodiments thereof and also with reference to the accompanying drawings.

DETAILED DESCRIPTION OF THE EMBODIMENTS

Figure 1:
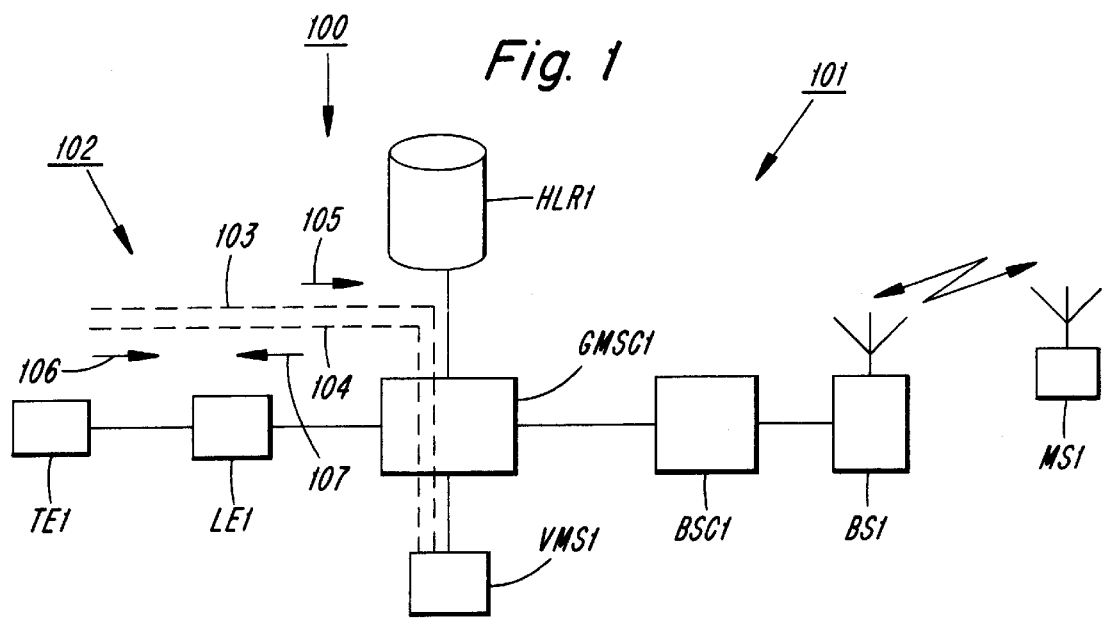
FIG. 1 is a view illustrating a communication network.

FIG. 1 is a view illustrating a communication network 100 in which the inventive service may be implemented. The communication network 100 is illustrated as comprising a Public Land Mobile Network (PLMN), which in this example constitute a cellular network 101, and a Public Switched Telephone Network (PSTN), which will be referred to simply as a telephone network 102. The illustrated cellular network 101 has a network structure which may conform to e.g. the GSM-specifications. The cellular network 101 comprises a home location register (HLR) HLR1, where subscription information for mobile subscribers are stored. The cellular network 101 further comprises a gateway mobile switching center (GMSC) GMSC1, which acts both as an ordinary mobile switching center (MSC) and as a gateway for interconnecting the cellular network 101 with the telephone network 102. A base station BS1 is connected to the gateway mobile switching center GMSC1 via a base station controller (BSC) BSC1. The base station BS1 provides radio coverage in part of the geographical area served by the gateway mobile switching center GMSC1. A mobile station MS1 communicates via radio with the base station BS1 and enables a user, which will be referred to as a mobile subscriber, to communicate with other parties connected to the communication network.

The cellular network 101 also comprises a voice messaging system VMS1 which is connected to the gateway mobile switching center GMSC1. The mobile subscriber is also a voice mail subscriber and consequently, there is a mailbox in the voice messaging system VMS1 assigned to this particular subscriber. If a calling party tries to call the mobile subscriber when not available, e.g. by the mobile station MS1 being powered off, the calling party will be routed to the voice messaging system VMS1 and will be given the option to leave a voice message in the mailbox of the mobile subscriber/voice mail subscriber. In FIG. 1, reference MS1 is used to interchangeably represent both the mobile subscriber/voice mail subscriber as well as his mobile station. Since the voice mail subscriber role is that of foremost importance when describing the invention, the party will most often be referred to as "the voice mail subscriber MS1".

The telephone network 102 comprises a local exchange LE1 to which a telephone TE1 is connected which enables a telephone subscriber, having a subscription in the telephone network 102, to communicate with other parties connected to the communication network 100, e.g. the mobile subscriber MS1. In FIG. 1, reference TE1 is used interchangeably to represent both the telephone subscriber as well as his telephone set.

Since all of the elements described above are well known to a person skilled in the art, the general function of each of these network elements will not be elaborated upon any further. Note also that FIG. 1 is only intended to serve as an illustration of the invention why only those elements necessary to serve this purpose have been included in FIG. 1.

Figure 2B:
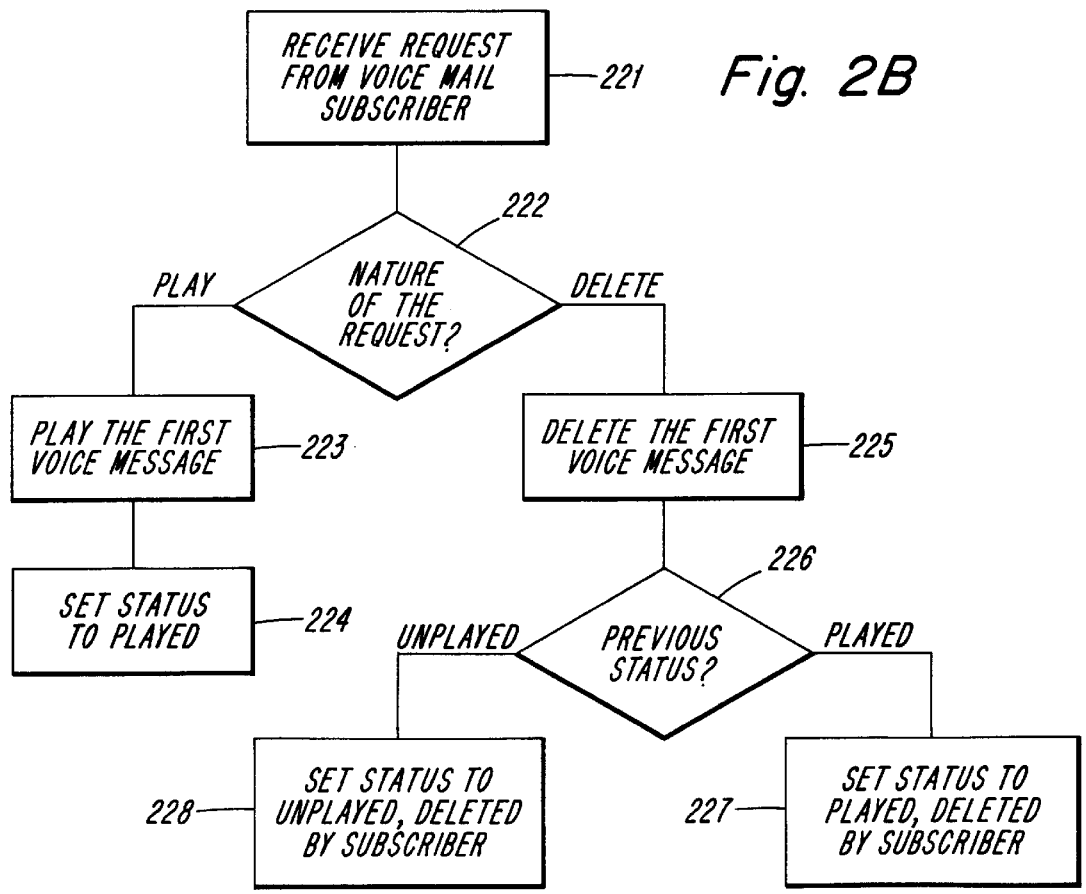
FIGS. 2A–2B are flowsheets illustrating a method according to a first embodiment of the invention.
Figure 2A:
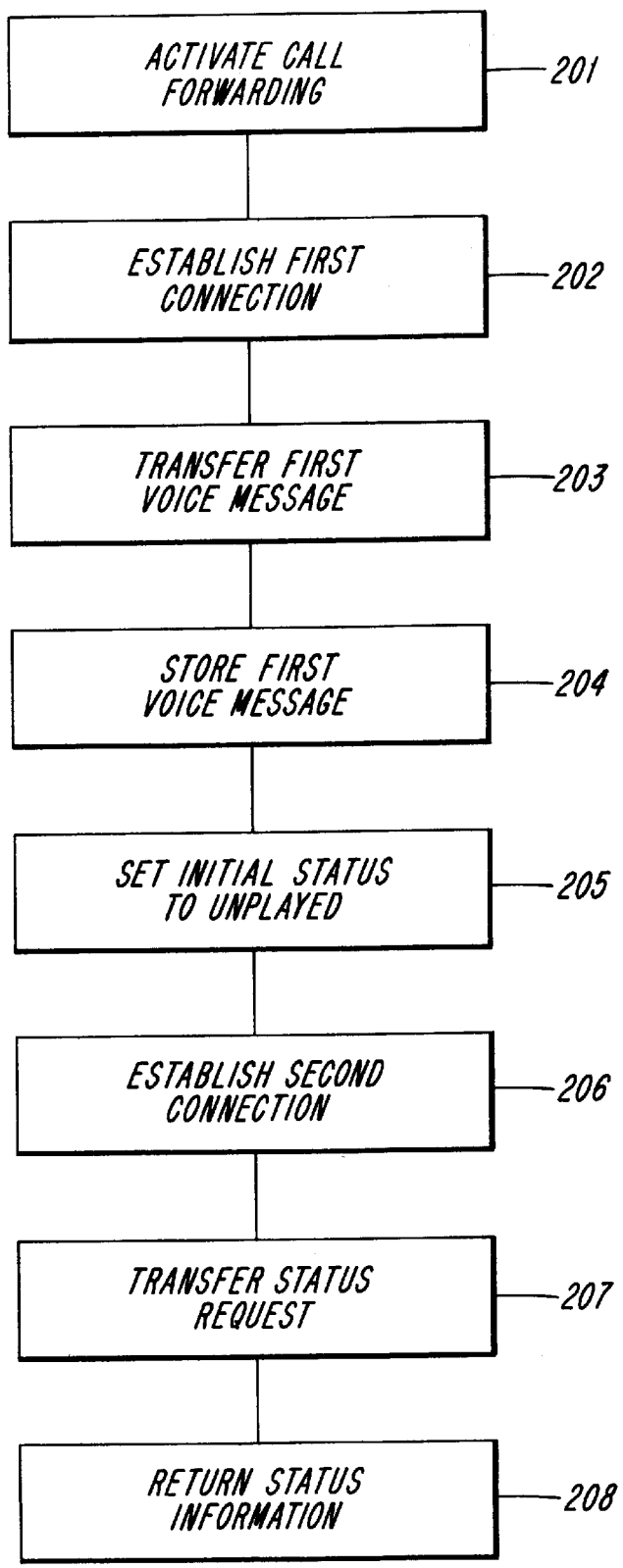

FIGS. 2A–2B depict flow charts illustrating a method according to a first embodiment of the invention.

At step 201 in FIG. 2A, the mobile subscriber MS1 activates a call forwarding service in the cellular network 101 such that at least some calls to the mobile subscriber MS1 will be routed to the voice messaging system VMS1. The activation may be performed either directly, by sending signals from the mobile station MS1 or indirectly, by requesting network operator personnel to activate the call forwarding service. As familiar to a person skilled in the art, there are several different call forwarding services that, according to different criteria, determines when to forward a call to the voice messaging system VMS1. Examples of these criteria/services are call forward on busy, call forward on MS not reachable, call forward on no answer, call forward unconditionally etc.

At some point later, a calling party, e.g. the telephone subscriber TE1, makes a phone call to the mobile subscriber MS1. The cellular network 101 forwards the call to the voice messaging system VMS1 and thus, at step 202, the communication network 100 establishes a first connection, 103 in FIG. 1, between the calling party TE1 and the voice message system VMS1. The voice messaging system VMS1, using voice prompting, invites the calling party to leave a voice message in the mailbox assigned to the voice mail subscriber MS1. Thus, assuming that the calling party wants to leave a voice message, at step 203 the communication network 100 uses the first connection 103 to transfer a first voice message 105 from the calling party TE1 to the voice messaging system VMS1. At step 204 the voice messaging system VMS1 stores the first voice message 105 in the mailbox assigned to the mobile subscriber MS1. The international subscriber number of the calling party TE1 is also transferred, using a calling line identification service, to the voice messaging system VMS1 where it is linked to the first voice message 105. At step 205 the voice messaging system VMS1 initiates a data structure, holding information on message status for the first voice message 105, such that the initial message status indicates the message as being unplayed.

At some point later on, the calling party TE1 wants to know whether the voice mail subscriber MS1 has listened to the first voice message 105. Thus, at step 206, the communication network 100 establishes, upon request by the calling party TE1, a second connection, 104 in FIG. 1, between the calling party TE1 and the voice messaging system VMS1. The connection establishment occurs as follows. The calling party TE1 requests the communication network 100 to establish the second connection 104 by dialing the trunk access code of the cellular network 101, a service code and the mobile subscriber directory number. For example, assuming the trunk access code is 070, the service code *1* and the mobile subscriber directory number is 6724132, the calling party TE1 would dial 070-*1*-6724132. The telephone network 102 recognizes, from the trunk access code, that the call should be routed to the gateway mobile switching center GMSC1 in the cellular network 101. The gateway mobile switching center GMSC1 recognizes, from the service code, that the calling party wants to interrogate the voice messaging system VMS1 for the status of a voice message. In the home location register HLR1, there is data in the subscriber record of the mobile subscriber MS1 that is set according to whether or not the mobile subscriber/voice mail subscriber MS1 allows access to his mailbox for status checking by other parties. The gateway mobile switching center GMSC1 interacts with the home location register HLR1, to determine whether the mobile subscriber/voice mail subscriber MS1 allows such access. If access is not allowed, the caller is informed that status checking of messages in the mailbox assigned to the mobile subscriber MS1 is disabled. If access is allowed, the second connection 104 is set up between the voice messaging system VMS1 and the calling party TE1.

At step 207, the communication network 100 uses this second connection 104 to transfer, from the calling party TE1 to the voice messaging system VMS1, a request 106 for message status of the first voice message 105. At step 208, the voice messaging system VMS1 plays a second voice message, indicating the message status of the first voice message, which the communication network 100 transfers from the voice messaging system VMS1 to the calling party TE1 using the second connection 104. More in detail, steps 207 and 208 are implemented as follows. At step 207 the voice messaging system VMS1 uses voice prompting to ask the calling party TE1 for a date when the message was left and an international subscriber number used as calling party number, i.e. used as A-number, when leaving the first voice message. In response, the calling party provides the date and the used A-number via a keypad on his telephone TE1. The communication network 100 transfers the date and A-number to the voice messaging system VMS1 using so called dual tone multiple frequency (DTMF) codes which are well known in the art. On receipt of the date and the A-number, the voice messaging system VMS1 searches for messages in the mailbox assigned to the voice mail subscriber MS1 linked to the provided A-number and stored on the given date. The most recent message is selected and the status of the message is presented at step 208 by said second voice message. The second voice message may, in addition to presenting the status of the first voice message, also inform the calling party TE1 of when the latest action causing a status change occurred. If no message matching the specified date and A-number is found, the voice messaging system VMS1 plays a voice message saying "No message exists". If the voice messaging system VMS1 finds several messages MS1 linked to the provided A-number and stored on the given date, the calling party TE1 is given the option to run through the list of messages on a last in/first out (LIFO) basis.

The voice mail subscriber MS1 may, at any time after the first voice message has been stored, establish a connection to the voice messaging system VMS1 and request the voice messaging system VMS1 to perform actions on the stored first voice message which will alter the message status of said message. FIG. 2B illustrates at step 221 how such a request is received by the voice messaging system VMS1 from the voice mail subscriber MS1. At step 222, the voice messaging system VMS1 determines the nature of the request. If the processing at step 222 results in an alternative "PLAY", the voice messaging system VMS1 plays the first voice message at step 223 and updates, at step 224, the message status of the first voice message to indicate that the message has been played. If the processing at step 222 results in an alternative "DELETE", the voice messaging system VMS1 at step 226 determines the previous status of the first voice message. If the processing at step 226 results in an alternative "PLAYED", the voice messaging system VMS1 updates, at step 227, the message status for the first voice message to indicate that the first message has been deleted by the voice mail subscriber after being played. If the processing at step 226 results in an alternative "UNPLAYED", the voice messaging system VMS1 updates, at step 228, the message status for the first voice message to indicate that the message has been deleted by the voice mail subscriber without the subscriber having listened to the message.

The first voice message may be deleted, not only by the voice mail subscriber MS1, but also by the voice messaging system VMS1 when the voice messaging system determines that the first voice message has been unplayed for a system parameter controlled time period. If this situation occurs, the voice messaging system VMS1 updates the message status to indicate that the first voice message was never played and has been deleted by the voice messaging system VMS1.

Figure 3:
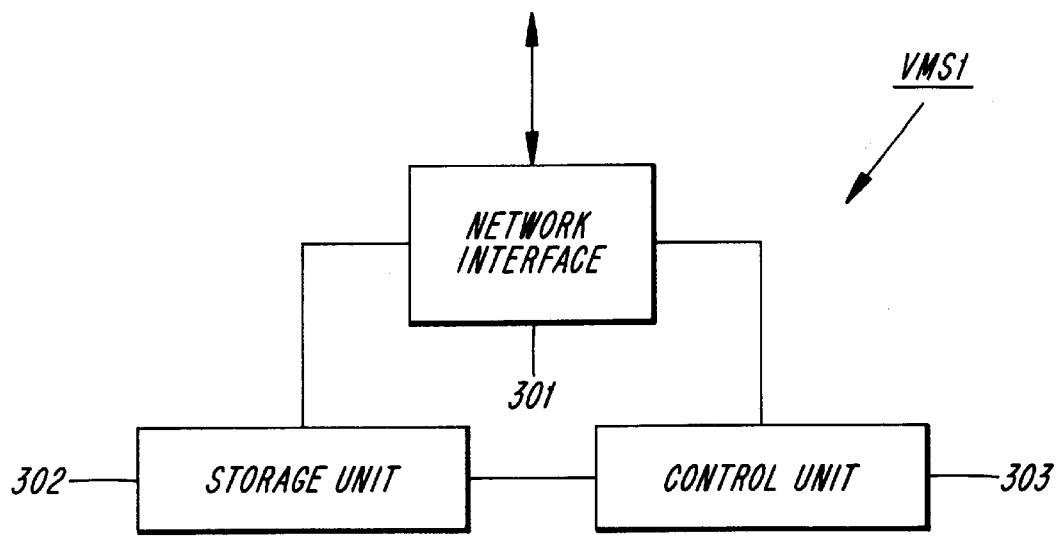
FIG. 3 is a block schematic illustrating a voice message system.

FIG. 3 is a block schematic of the voice messaging system VMS1. The voice messaging system comprises a network interface 301, a storage unit 302 and a control unit 303.

The network interface 301 provides an interface to the rest of the communication network 100. It is via this interface that the calling party TE1 and voice mail subscriber MS1 interacts with the voice messaging system VMS1.

Figure 4:
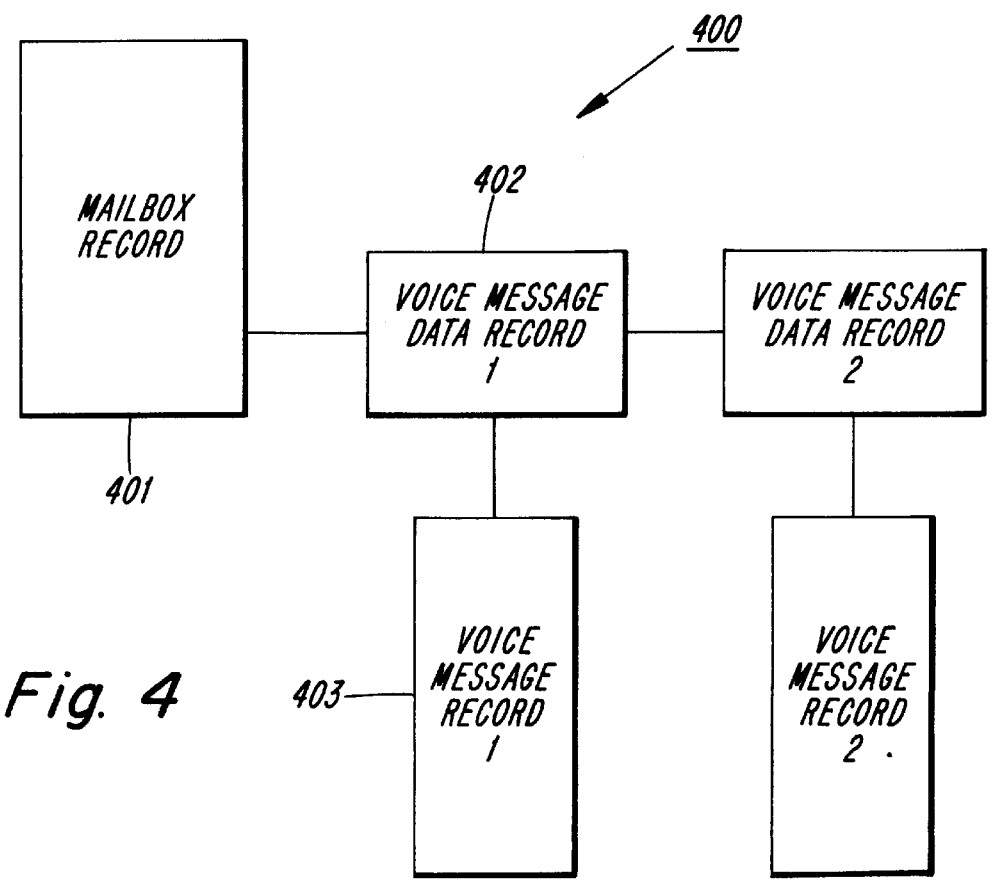
FIG. 4 is a block schematic illustrating a mailbox data structure.

For each mailbox defined in the voice messaging system VMS1, the storage unit 302 comprises a mailbox data structure. FIG. 4 illustrates the mailbox data structure 400 for the voice mail subscriber MS1. It comprises a mailbox record 401, comprising data related to the whole mailbox e.g. the identity of the voice mail subscriber MS1 to which the mailbox is assigned. It also contains a reference to a list of voice message data records 402, one for each voice message that is held by the mailbox. Each voice message data record 402 holds data related to one voice message received from a calling party. The data held in one of the voice message data records 402 comprises:

international subscriber number of the calling party, e.g. the telephone subscriber TE1;

message status, indicating the status of the voice message;

date and time when the voice message was stored;

date and time of the latest change of the message status a reference to a voice message record 403;

a link to a possible other voice message data record 402 in the mailbox.

The voice message record 403 holds the actual voice message, e.g. the first voice message 105 from the calling party TE1. There are of course many other ways of organizing a mailbox data structure apart from the way illustrated in FIG. 4.

The control unit 303 in FIG. 3 comprises:

means for storing the first voice message 105 from the calling party TE1 in the mailbox data structure 400 and initiating the mailbox data structure 400, i.e. the voice message data record 403, upon storage of the first voice message 105 such that the initial message status indicates the message as being unplayed;

means for receiving, from the calling party TE1, a request 106 for the message status of the first voice message 105;

means for reporting, to the calling party TE1, information 107 reflecting the status of the first voice message by playing a second voice message indicating the message status of the first voice message;

means for playing the first voice message 105 upon request by the voice mail subscriber MS1 and updating the mailbox data structure 400, i.e. the voice message data record 402, to indicate that the first voice message 105 has been played;

means for deleting the first voice message 105, i.e. the voice message record 403, from the mailbox data structure 400 upon request by the voice mail subscriber MS1 and updating the mailbox data structure 400, i.e. the voice message data record 402, to indicate, depending on whether the message has been played or not, either that the first voice message has been deleted by the voice mail subscriber after the subscriber have played the message or that the first voice message has been deleted by the voice mail subscriber without the subscriber having played the message;

means for, when the control unit 303 determines that the first voice message 105 has been unplayed for a period of time, controlled by a system parameter, automatically deleting the first voice message from the mailbox data structure and updating the mailbox data structure 400, i.e. the voice message data record 402, to indicate that the first voice message never was played and has been deleted by the voice messaging system.

Note that when the control unit 303 deletes the first voice message 105, the voice message record 403 is immediately deleted, but the voice message data record 402 is retained for a system parameter controlled period of time, e.g. two weeks. In this way, the voice messaging system VMS1 is able to report the message status of the first voice message 105 also when the actual message has been deleted.

An example of a suitable platform for building a voice messaging system VMS1 according to the present invention is the MXE messaging applications platform from Ericsson Messaging Systems Inc.

The gateway mobile switching center GMSC1 in the cellular network 101 and the local exchange LE1 in the telephone network 102 work together as a transferring means for establishing connections 104–105 between the calling party TE1 and the voice messaging system VMS1 and for transferring information between the calling party TE1 and the voice messaging system VMS1 over said connections.

There are several different ways of providing alternative embodiments of the present invention by modifying the described first embodiment.

The invention can of course also be applied in other types of cellular networks, e.g. AMPS/D-AMPS, PDC, NMT etc, offering voice mail services to mobile subscribers, but also in communication networks offering voice mail services to fixed telephony or ISDN subscribers.

In the described first embodiment of the invention, the A-number of the calling party is automatically transferred, using the calling line identification (CLI) service, as the first voice message is recorded and stored. When the calling party later on makes a request for the message status of the first voice message, the calling party provides the A-number via a keypad on his telephone. The reason for storing the A-number when leaving the first voice message and also providing the A-number when requesting the message status, is to provide a means for relating the status request to the stored first voice message. There are several different alternative ways this can be done. One alternative is to rely on the CLI-service to provide the A-number also when requesting the message status. This would however require the calling party to use the same A-number, i.e. use the same phone line/mobile phone, both when storing the first voice message and when requesting the message status. A second alternative is to let the calling party provide a code number e.g. his civic registration number or his birthday date or any other selected code number, both when leaving the voice message and when requesting the message status. Note that preferably the calling party should be prompted to select the code number in a way that minimizes the risk that two different persons would select the same number. A third alternative for relating the message status request to the stored first voice message, would be to let the voice messaging system select a message key and transfer this key to the calling party when the message is being stored. The calling party will then need to provide the message key when he makes a request for the message status.

In the described first embodiment of the invention, the status of the voice message is returned to the calling party as a second voice message. However, the status could also be reported in the form of an alphanumeric message, provided the calling party has the necessary means for receiving and displaying alphanumeric messages.

What is claimed is:

1. A method in a communication network for reporting status of voice messages stored in a voice messaging system in the communication network, the method comprising the steps of:

transferring a first of the voice messages from a calling party to the voice messaging system;

storing the first voice message in a mailbox assigned to a voice mail subscriber;

initiating, in the voice messaging system, a data structure containing a message status for the first voice message, wherein the initial message status indicates the message as being unplayed by the voice mail subscriber and the message status contained in the data structure is updated to reflect access by the mail subscriber to the first voice message;

transferring a request for the message status of the first voice message from the calling party to the voice messaging system; and transferring information reflecting the status of the first voice message from the voice messaging system to the calling party.

2. A method according to claim 1, wherein a call forwarding service is activated for the voice mail subscriber such that at least some calls to the voice mail subscriber will be forwarded to the voice messaging system, wherein said first connection is established when a call from the calling party to the voice mail subscriber is being forwarded to the voice messaging system.

3. A method according to claim 1, further comprising:

establishing a second connection between the calling party and the voice messaging system, wherein the request for the message status of the first voice message and the information reflecting the status of the first voice message are transferred using said second connection.

4. A method according to claim 1, further comprising:

playing, upon request by the voice mail subscriber, the first voice message; and updating the message status to indicate that the first voice message has been played.

5. A method according to claim 1, further comprising:

deleting, upon request by the voice mail subscriber, the first voice message; and updating the message status to indicate that the first voice message has been deleted by the voice mail subscriber.

6. A method according to claim 5, where in the message status is updated to reflect whether the message was played or unplayed prior to deletion of the message.

7. A method according to claim 1, further comprising:

deleting the first voice message, when the voice messaging system determines that the first voice message has been unplayed by the voice mail subscriber for a system parameter controlled time period; and updating the message status to indicate that the first voice message never was played and has been deleted by the voice messaging system.

8. A method according to claim 1, wherein said second transferring step includes that the information, reflecting the status of the first message, is provided by playing a second voice message indicating the message status of the first voice message.

9. A voice messaging system comprising:

a storage unit comprising a mailbox data structure, defining a mailbox assigned to a voice mail subscriber and being arranged for holding both voice messages from calling parties to the voice mail subscriber and information on message status for the voice messages;

a control unit comprising:

means for storing a first voice message from one of the calling parties in the mailbox data structure;

means for storing in the mailbox data structure a message status for the first voice message, wherein upon storage of the first voice message the message status indicates the message as being unplayed by the voice mail subscriber and the mailbox data structure is updated to reflect access by the mail subscriber to the first voice message;

wherein the control unit further comprises:

means for receiving, from the calling party, a request for the message status of the first voice message after said message has been stored; and means for reporting, to the calling party, information reflecting the status of the first voice message.

10. A voice messaging system according to claim 9, wherein the control unit further comprising means for playing the first voice message upon request by the voice mail subscriber and updating the mailbox data structure to indicate that the first voice message has been played.

11. A voice messaging system according to claim 9, wherein the control unit further comprises means for deleting the first voice message from the mailbox data structure upon request by the voice mail subscriber and updating the mailbox data structure to indicate that the first voice message has been deleted by the voice mail subscriber.

12. A voice messaging system according to claim 11, wherein the control unit further comprising means for updating the mailbox data structure, when the first voice message has been deleted, to indicate whether the message was played or unplayed prior to deletion of the message.

13. A voice messaging system according to claim 9, wherein the control unit further comprising means for automatically deleting the first voice message from the mailbox data structure when the control unit determines that the first voice message has been unread for a system parameter controlled time period and updating the mailbox data structure to indicate that the first voice message never was played and has been deleted by the voice messaging system.

14. A voice messaging system according to claim 9, wherein the reporting means is arranged for playing a second voice message indicating the message status of the first voice message.

15. A communication network comprising:
   a storage unit comprising a mailbox data structure, defining a mailbox assigned to a voice mail subscriber and being arranged for holding both voice messages from calling parties to the voice mail subscriber and information on message status for the voice messages;
   a control unit comprising:
      means for storing a first voice message from one of the calling parties in the mailbox data structure; and
      means for storing in the mailbox data structure a message status for the first voice message, wherein upon storage of the first voice message the message status indicates the message as being unplayed by the voice mail subscriber and the mailbox data structure is updated to reflect access by the mail subscriber to the first voice message; and
      transferring means, arranged for transferring from the calling party to the voice messaging system, the first voice message and thereafter the request for message status of said message and for transferring from the voice messaging system to the calling party, the information reflecting the status of said message.

16. A communication network according to claim 15, wherein the transferring means is arranged for establishing a first connection between the calling party and the voice messaging system, and that this first connection is used to transfer the first voice message from the calling party to the voice messaging system.

17. A communication network according to claim 16, wherein the transferring means is arranged for establishing the first connection when the calling party makes a telephone call to the voice mail subscriber and the voice mail subscriber has a call forwarding service activated, which forwards at least some calls to the voice messaging system.

18. A communication network according to claim 13, wherein the transferring means is arranged for establishing a second connection between the calling party and the voice messaging system, and that this second connection is used to transfer both the message status request from the calling party to the voice messaging system, and the information reflecting the message status from the voice messaging system to the calling party.

* * * * *